United States Patent Office 2,913,481
Patented Nov. 17, 1959

2,913,481

ESTERS OF HYPONITROUS ACID

John Woolley Batty, Arthur Lambert, and Gerald Scott, Blackley, Manchester, and Leslie Seed, Northwich, England, assignors to Imperial Chemical Industries Limited, Millburne, London, England, a corporation of Great Britain No Drawing. Application April 29, 1957
Serial No. 655,478

Claims priority, application Great Britain May 2, 1956

8 Claims. (Cl. 260—466)

This invention relates to esters and more particularly to hyponitrous esters especially useful as catalysts for the polymerisation of ethylenically unsaturated compounds.

This application is a continuation-in-part of our application Serial No. 607,559, filed September 4, 1956, and now abandoned.

It has already been proposed, in specification Ser. No. 618,168, now Patent Number 2,809,787, to use for example alkyl, allyl or benzyl hyponitrites as catalysts for the polymerisation of ethylenically unsaturated compounds.

Of these hyponitrites, which have been prepared by interaction between silver hyponitrite and alkyl, allyl or benzyl iodide, bis-benzyl and allyl hyponitrites are very inefficient initiators, particularly in the case of the less reactive monomers such as vinyl acetate or ethylene. Alkyl hyponitrites are more efficient initiators, but are not obtained in good yield by this method. We have now found that when there is used, in place of an alkyl iodide, an organic halide which may be a dihalide in which the organic residue contains at least one ether oxygen atom, the organic hyponitrites so obtained are also valuable catalysts for the polymerisation of ethylenically unsaturated compounds, and in particular for the polymerisation of such unreactive monomers as ethylene and vinyl acetate.

Thus according to the present invention we provide new esters of hyponitrous acid wherein the organic residue contains at least one ether oxygen atom, preferably on an alpha carbon atom.

The new organic hyponitrites have the formula R—O—N=N—O—R' wherein R and R' stand for organic radicals containing at least one ether oxygen atom, preferably on the alpha carbon atom. Furthermore, R and R', and optionally the hyponitrous acid residue may form part of a ring system.

The new organic hyponitrites may be prepared by interaction between silver hyponitrite or other metal hyponitrite and a halide R—Hal (when monomeric compounds are obtained) or Hal—R—Hal (when polymeric compounds may be obtained) wherein R has the significance stated above, preferably in solution in an inert hydrocarbon solvent, for example white spirit, ethers or aromatic hydrocarbons. Other solvents that may be used include readily volatile compounds and liquefied gases including ethylene and also other polymerisable monomers that are to be polymerised by means of the hyponitrite. The reaction is controlled by external cooling of the reaction mixture usually to a temperature of —20° C. to 10° C., preferably to below —10° C. When the reaction is finished, the silver halide may be removed by filtration. The so-obtained solution of the hyponitrite may be used as such, for example in the polymerization of ethylenically unsaturated compounds, or the hyponitrite may be isolated therefrom, for example by evaporation of the solvent at low temperature or by crystallisation at low temperature. The pure hyponitrous esters are however dangerous detonating explosives and isolation is usually avoided. Hyponitrites can be prepared from unstable halides which can be generated in situ.

The yield of the new hyponitrites is greater than the yield of alkyl hyponitrites described in the prior art when prepared by the same general reaction. Thus, for example, whereas the yield of isobutyl hyponitrite by interaction between silver hyponitrite and isobutyl iodide is about 10%, the yield of methoxymethylhyponitrite from chloromethyl ether under similar conditions is about 95%.

Other hyponitrites included within the general class provided by this invention include esters (which may be polymeric) of the general structure

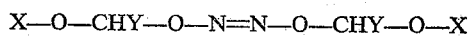

X—O—CHY—O—N=N—O—CHY—O—X wherein X may be alkyl, alkoxyalkyl, cycloalkyl or aryl and Y may be hydrogen, alkyl, cycloalkyl, aryl, alkoxy, alkoxyalkyl or may form part of a ring with X.

Those hyponitrites are preferred which contain the structure R"—O—CH$_2$—O—N=N—O—CH$_2$—O—R" wherein R" stands for ethyl, n- or isopropyl, n-, iso- or sec-butyl, iso-amyl, n- or sec-octyl, 2:4:4-trimethylpentan-2-yl, 3:5:5-trimethyl-hexan-1-yl, dodecyl, cyclohexyl, etc., or stands for a difunctional group containing for example other or the same α-alkoxyalkyl hyponitrite groups, α-chloroether groups, etc.; examples of such hyponitrites are those obtained from bis(halogenomethyl) ethers, etc. Also within this preferred class are tetrahydropyranyl and tetrahydrofuranyl hyponitrites.

The invention is illustrated but not limited by the following examples in which parts and percentages are by weight.

Example 1

27.6 parts of silver hyponitrite and 22.2 parts of monochloromethyl ether are cooled in ice and are mixed together in 200 parts of white spirit and the mixture is stirred for 16 hours at 0° C. At the end of this time, the silver chloride is removed by filtration at 0° C. and bis-methoxymethyl hyponitrite is obtained as a solution in white spirit. The yield of bis-methoxymethyl hyponitrite may be determined by adding 5 parts of an 80/20 ethanol-water mixture to 1 part of the solution thereof first obtained, followed by warming to 50° C. and measurement of the volume of nitrogen evolved. The yield so determined is about 70% based on silver hyponitrite and the concentration of the ester in the white spirit is about 5.3%.

Example 2

2.08 parts of silver hyponitrite and 25 parts of the diethyl ether of diethylene glycol are stirred at —10° C. whilst 1.27 parts of monochloromethyl ether are slowly added. The solution is stirred for 12 hours at —10° C. and is then filtered at 0° C. from the precipitated silver chloride and the precipitate is washed with two portions of 0.9 part of the diethyl ether of diethylene glycol. The solution so obtained has a concentration of approximately 22% of bis-methoxymethyl hyponitrite as determined by the nitrogen evolution method of Example 1. The yield of bis-methoxymethyl hyponitrite is 90–95% of the theoretical.

Example 3

1.04 parts of silver hyponitrite and 5.0 parts of dry ether are stirred at —10° C. whilst 0.635 part of monochloromethyl ether is slowly added. The solution is stirred for a further 12 hours at 0° C. and is then filtered at 0° C. and the residual silver chloride is washed with two portions of 1.5 parts of ether. The ether solution is evaporated in a slow stream of dry air whilst maintaining the temperature at 0° C. Bis-methoxymethyl hyponitrite is obtained as a pale yellow oil; the oil is a detonating explosive sensitive to friction, shock or sudden temperature change.

*Example 4*

2.08 parts of silver hyponitrite and 2.5 parts of the diethyl ether of diethylene glycol are stirred at —10° C. whilst 1.84 parts of chloromethyl isobutyl ether are slowly added. The solution is stirred for 12 hours at 0° C. and is then filtered from the precipitated silver chloride and the precipitate is washed with two portions of 1 part of the diethyl ether of diethylene glycol. The solution has a concentration of approximately 25% of isobutoxymethylhyponitrite, as determined by the nitrogen evolution of Example 1. The yield of isobutoxymethyl hyponitrite is approximately 70% of the theoretical.

*Example 5*

27.6 parts of silver hyponitrite and 100 parts of the diethyl ether of diethylene glycol are mixed and stirred at —15° C. and 24.2 parts of 2-chlorotetrahydropyran are slowly added. The mixture is stirred at —15° C. for 12 hours and then the silver chloride is removed by filtration at 0° and is washed twice with 50 parts of the diethyl ether of diethylene glycol. A portion of the solution is estimated by the method of Example 1 and the yield of ester is found to be about 80% of the theoretical.

*Example 6*

2.6 parts of freshly fractionated methoxymethyl chloride are added to 35 parts of petroleum ether of boiling range 40°–60° C. The solution is stirred at 0° C. and 6 parts of finely powdered silver hyponitrite are added during 10 minutes. The mixture is then stirred rapidly for 4 hours.

The reaction mixture, which changes from a yellow suspension to almost a pure white colour, is filtered through a precooled filter, the residue is rendered safe for recovery purposes by treatment with ethanol and the filtrate, which when analysed by the method of Example 1 gives a yield of 66%, is stored at —35° C. for 3 days. A white mass of crystals deposits from solution. The mother liquors are decanted and the crystals are washed successively with three 3.5 part portions of petroleum ether which has been precooled to —20° C.

The flask containing the damp solid is then evacuated for 3 hours at a temperature of —18° C. Air is then admitted with extreme caution and the purified crystals are immediately dissolved in 19 parts of dry white spirit at —10° C.

As material containing only 75% bis-methoxymethyl hyponitrite is an extremely sensitive detonating explosive the purified crystals of the substance are not handled in any way.

*Example 7*

4 parts of isobutoxymethyl chloride (purity 99.5%) and 30 parts of petroleum ether (B.P. 40°–60° C.) are stirred in a vessel cooled in ice-water.

5 parts of powdered silver hyponitrite are added during 10 minutes and the stirring is continued for 6 hours.

The mixture is filtered and the residue is washed with two 7 part portions of petroleum ether; analysis of the combined filtrates by the method of Example 1 gives a yield of 68% of theory. The product is stored overnight on solid carbon dioxide when a mass of crystals separates. The supernatant liquor is decanted and the crystals are washed by decantation three times with successive 3.5 part portions of cold petroleum ether.

The washed solid is dried by evacuation to 1 mm. pressure for 3 hours at 0° C. The pure white crystals obtained correspond to a 52% yield. The pure compound is a sensitive detonating explosive but may be handled with the usual precautions. Properties of the product are melting point 3–6° C., nitrogen 12.1% (theory 12.0%).

0.102 gm. of the crystallised isobutoxymethyl hyponitrite is dissolved in 2 ml. of white spirit and is heated to 60° C. The gas evolved is collected over white spirit in a gas burette and the volume is measured at the same temperature (21° C.) as that of the cooled spent solution. 96.2 mls. of gas (98.6% theory) substantially nitrogen, are evolved. The experiment is repeated; the gas is collected over mercury and analysed. No gases other than nitrogen and about 2% of hydrogen are detected. $CO_2$, oxygen, $CH_4$ and hydrocarbon gases are shown specifically to be absent by vapour phase chromatography.

A similar yield of gas, but this time containing about 5% hydrogen, is obtained when the pure hyponitrite is dissolved in purified diethyl oxalate.

The pure hyponitrite is soluble to the extent of 24% in white spirit at —14° C. and 5% at —36° C.; that solution exhibits absorption in the infra red region which is characteristic and is predominantly at 973 and 984 cm.$^{-1}$.

*Example 8*

The process of Example 7 is repeated using 5.38 parts of cyclohexyloxymethyl chloride (99.5%) and 5.5 parts of silver hyponitrite. A yield of 70% of the ester is obtained. After crystallisation and washing, evacuation to 1 mm. at 0° C. causes the solid to sublime, and 2.46 parts (48%) of feathery crystals are recovered. This hyponitrite is only a feeble explosive and can be handled safely with moderate care. Melting point 37° C. (decomp.); nitrogen (theory 9.8) 10.0%.

When the hyponitrite is successively recrystallised from light petroleum ether the melting point is raised to a limiting value of 41.5° C. and the total nitrogen content (micro Dumas) is then 10.1%.

In a similar manner to that of Example 7, the hyponitrite is decomposed in solution in white spirit, diethyl oxalate and diethyl carbitol. In each case 97.8–99.3% of the theoretical amount of gas is evolved. In each case the gas is nitrogen containing 2.9% $H_2$, 10% $H_2$, and 8% $H_2$ respectively. When crystalline cyclohexyloxymethyl hyponitrite is decomposed cautiously, the evolved gases are nitrogen containing 3% $H_2$. The pure hyponitrite is soluble to the extent of 15% at 0° C. and 5% at —26° C. in white spirit. The corresponding temperatures in diethyl oxalate are —10° C. and —38° C. The pure substance when dissolved in white spirit, exhibits a characteristic absorption in the infra red at 968 cm.$^{-1}$.

*Example 9*

27.6 parts of silver hyponitrite and 200 parts of toluene are stirred at —60° C. and 21.4 parts of freshly distilled 2-chlorotetrahydrofuran are added slowly. The temperature of the mixture is allowed to rise to —30° C. over 2 hours with stirring, and the temperature is maintained at this temperature for a further 16 hours. The silver chloride is then removed by filtration and the white spirit washed twice with 25 parts of toluene at —10° C. A portion of the combined filtrates is estimated for azo compound by the method of Example 1: the yield of ester is 75%.

*Example 10*

The conditions of Example 5 are repeated except that 31.4 parts of α-methoxybenzyl chloride are used instead of 2-chlorotetrahydropyran. The yield of α-methoxy benzyl hyponitrite is 95%.

*Example 11*

The conditions of Example 9 are repeated except that 35.4 parts of α-ethoxy-α-cyclohexylmethyl chloride are used instead of 2-chlorotetrahydrofuran. The yield of hyponitrous ester is 92% of theory.

*Example 12*

The conditions of Example 9 are repeated except that 30 parts of freshly distilled phenoxymethyl chloride are used in place of α-chlorotetrahydrofuran. The yield of ester is 60% of theory.

*Example 13*

27.6 parts of silver hyponitrite and 200 parts of the diethyl ether of diethylene glycol are mixed and stirred at −20° C. and 12 parts of sym-dichloromethyl ether are added slowly. The mixture is stirred at −20° C. for 12 hours when the chloride is removed rapidly by filtering through a filter funnel cooled to −20° C. The residue is extracted twice with 50 parts of the solvent. The yield of ester (poly-1:2-aza-3:5:7-oxaheptane) decomposing between 10° and 45° C. by the method of Example 1 is 75%.

*Example 14*

The method of Example 13 is repeated except that 15.7 parts of 2:3-dichloro-1:4-dioxane are used in place of the dichloromethyl ether. The yield of ester is 96%.

*Example 15*

20.7 parts of silver hyponitrite and 25 parts of the diethyl ether of diethylene glycol are stirred and cooled to −15° C. 12.75 parts of chloromethyl ether are added over 3 hours, keeping the internal temperature below −12° C. and the mixture is stirred for a further 18 hours. After filtration through a cooled filter, the precipitate is washed twice with solvent (7 parts). The solution is stored safely at −15° to −20°. Analyses of the solution showed the yield of ester to be 98.8% and the concentration to be 32.2%.

*Example 16*

24 parts of sym-dichloromethyl ether and 200 parts of the diethyl ether of ethylene glycol are stirred at −20° C. and 27.6 parts of silver hyponitrite are added in small portions over 2 hours. At the end of this time the mixture is almost white, and stirring is continued at −20° C. for a further 2 hours. The silver chloride is filtered through a cooled filter funnel. Analysis of the solution in the usual way shows it to contain 93% of the expected hyponitrite. Chloride analysis shows that the chloride content is that expected for bis-chloromethoxymethyl hyponitrite.

*Example 17*

5.0 parts of α-isobutoxyethyl chloride (B.P. 33–34.5/18 mm. and containing 0.255 part titratable chlorine per part) are dissolved in 40 parts light petroleum ether and stirred at 0° C. 6.5 parts of pulverised silver hyponitrite are added gradually over 15 minutes and the whole is then stirred at 0° C. for 3½ hours. The silver residues are removed by filtration and are washed twice with 5 parts of solvent. The collected filtrates are then cooled to −80° C. A gentle swirl of the solution after 1 hour causes a white solid to crystallise; this is washed twice by decantation at −80° C. The solid is freed from adherent solvent by evacuation at 2 mm. pressure for 1 hour at −15° C. 2 parts of white solid α-isobutoxyethyl hyponitrite (M.P. −10° C. to 0° C.; micro Dumas 10.3% N (theory 10.7%) are obtained.

When the substance is decomposed in diethyloxalate solution according to the method of Example 7 almost twice the theoretical yield of gas is obtained. It is found on analysis that the gas consists of 48% $CH_4$, 1.9% $H_2$, 50.1% (difference) $N_2$. When the substance is decomposed as a 5% solution in white spirit the evolved gases consist of 32% $CH_4$, 1.2% $H_2$, 66.8 (difference) $N_2$. The pure hyponitrite is quite sensitive to heat and shock, but may be handled with extreme precautions. It is soluble in white spirit to the extent of 30% at −25° C.

*Example 18*

In a similar manner, 4.25 parts of α-methoxyisobutyl chloride (B.P. 23° C./17 mm. containing 102% of the theoretical titratable chlorine) are reacted with 5 parts of silver hyponitrite. The filtrate and washings are evaporated at 0° C. finishing under a vacuum of 5 mm. Hg for 2 hours. 2 parts of a sluggish oil are obtained (micro Dumas 11.9% N; theory for α-methoxyisobutyl hyponitrite 12.0% N). When the substance is decomposed in dilute solution in white spirit, 117% of the theoretical amount of gas is evolved.

*Example 19*

When 5.0 parts of silver hyponitrite are reacted with 3.6 parts of t-butyl chloromethyl ether in 40 parts of light petroleum at 0° to −10° C. for 24 hours, the silver residues coalesce into a viscous paste which is broken up by the addition of 30 parts of dry diethyl ether. After filtration a small amount of solid is frozen from the ether/petroleum solution, but the yield is small. When the solvent is evaporated, an orange red viscous oil is obtained which does not readily crystallise (micro Dumas 13.1% N, theory t-butoxymethyl hyponitrite 12.0%). The red oil is moderately explosive.

*Example 20*

3.9 parts of α-chlorotetrahydropyran are reacted with 5.5 parts of silver hyponitrite in 40 parts of light petroleum at −10° C. for 2 hours. The filtered residues are washed twice with 5 parts of solvent and the combined filtrates are cooled to −80° C. The white separated solid is washed by decantation and the residual solvent is removed by evacuation at a pressure of 2 mm. Hg and −15° C. 1.2 parts of white crystals are recovered (M.P. 43.2° C. decomp., 12.0% N; theory for α-tetrahydropyranyl hyponitrite 12.2% N). The substance is more sensitive than benzoyl peroxide to shock, but the detonation is of comparable violence. The compound may therefore be handled safely with ordinary care. It is soluble to the extent of 15% in diethyl oxalate at −8° C. The pure substance, when dissolved in diethyl oxalate, exhibits strong infra red absorption at 950 and 964 cm.$^{-1}$; the minor features of the spectrum are masked by the strong absorption of the solvent.

*Example 21*

4.37 parts of α-chlorotetrahydropyran are dissolved in 30 parts of pure diethyloxalate and stirred at 0° C., whilst 5.5 parts of silver hyponitrite are added in small portions. The mixture is stirred at 0° C. for 3½ hours. After filtration and washing of the residues twice with 5 parts of solvent, the combined filtrates are found to contain α-tetrahydropyranyl hyponitrite to the extent of 6.7 parts/100 parts solution as determined by the volume of gaseous decomposition products.

*Example 22*

7 parts of ethyl-α-bromo-α-ethoxy-acetate are reacted with 5 parts of silver hyponitrite suspended in 30 parts of dry ethyl ether. The mixture is stirred at 0° C. for 9 hours, and then allowed to stand for a further 10 hours. The pale yellow silver bromide is removed from the solution by filtration. The ethereal solution of ethoxycarbethoxymethyl hyponitrite is a clear golden yellow.

*Example 23*

8.5 parts of dodecyloxymethyl chloride are stirred with 5.5 parts of silver hyponitrite and 40 parts of light petroleum at 0° C. for 3 hours. A white solid is observed to crystallise around the edge of the liquid. When 15 parts of diethyl ether are added, the solid dissolves and the solution is filtered. The residue is washed with two portions each of 10 parts of dry diethyl ether. When the filtrates are cooled to −50° C. a white solid separates. This solid is collected and recrystallised from light petroleum, filtered and dried by evacuation. 5 parts of white crystals (M.P. 43.3 decomp.; 6.1% N, theory for dodecyloxymethyl hyponitrite 6.1% N). The substance, though readily decomposed by heat and inflammable, is not explosive and can be handled by ordinary techniques. The pure substance, when dissolved in carbon tetrachloride, exhibits infra red absorption bands typical or organic hyponitrites. The strongest characteristic band is at 972 cm.$^{-1}$.

*Example 24*

6.47 parts of octane-2-oxymethyl chloride are reacted with 5.5 parts of silver hyponitrite in 40 parts of white spirit at 0° C. for 3½ hours. The white silver residues are washed with two portions each of 5 parts of white spirit to yield 50 parts of a solution of bis, octane-2-oxymethyl hyponitrite.

*Example 25*

Similarly to Example 24 the reaction of isoamyl chloromethyl ether with 6.5 parts of silver hyponitrite yields 50 parts of a solution in white spirit of isoamyloxymethyl hyponitrite.

*Example 26*

6.5 parts of silver hyponitrite are stirred with 4.2 parts of ketene acetal in 20 parts of dry diethyl ether. 14 parts of a 2.57 N solution of anhydrous hydrogen chloride in dry ethyl ether is then added and the whole is stirred at —15° C. for 4 hours. The filtrates, after separation and washing of the silver residues, are evaporated by passage of dry nitrogen at 0° C. followed by evacuation at 1 mm. Hg pressure.

The residual yellow liquid contains 15.6% N (theory for α:α:α':α'-tetraethoxyethyl hyponitrite 9.5% N) and is hence a mixture of the expected hyponitrite and hyponitrous acid. The oil is moderately explosive and when decomposed in dilute solution in diethyl oxalate, yields gases of composition in 25% N$_2$O and 75% N$_2$. For comparison, when a solution of hyponitrous acid in dimethyl formamide is decomposed, 1 ml. of solution yields 13.1 ml. pure nitrous oxide (measured at N.T.P.).

*Example 27*

Similarly to Example 26 5.2 parts of ethyl orthoformate and 6.05 parts of silver hyponitrite are stirred in 25 parts of dry ether at 20° C., whilst 14.7 parts of a 2.4% N solution of anhydrous HCl in ether is added. The whole is then stirred between —20° C. and —5° C. for 23 hours; after this time the silver hyponitrite has only reacted partially, but the filtered solution is capable of yielding gas on warming, and is capable of initiating the polymerisation of ethylene.

*Example 28*

220 parts of silver hyponitrite and 280 parts of methylisobutylketone are stirred at —20° C. while a mixture of 112 parts of chloromethyl ether and 280 parts of methylisobutylketone is added gradually during 1½ hours, keeping the temperature between —20° C. and —10° C. The mixture is stirred for a further 5 hours at —20° C. and then filtered on a cooled filter; the residue is washed with 200 parts of methylisobutylketone in four portions, and the washings added to the filtrate. The combined filtrate and washings amount to 820 parts of a 12% solution of methoxymethyl hyponitrite, which is stored at —25° C.

*Example 29*

Silver hyponitrite (6.62 parts) and bromomethyl cyclohexyl ether (7.72 parts) are mixed with 26 parts petroleum of boiling range 40–60° C. in a reaction flask cooled to 0° C. and stirred together during four hours at 0° C. The reaction mixture is filtered through a filter cooled to 0° C. and the residue is washed twice with 4 parts petroleum. The combined filtrate and washings are cooled to —75° C. The cyclohexoxymethyl hyponitrite which crystallises out on cooling, is separated by decanting the supernatant liquid and redissolved in fresh petroleum at 0°. After two further recrystallisations at —75° C., the solid is dried in vacuo at 0° C. and found to melt at 39.9° C. with decomposition.

*Example 30*

1:3-dimethylbutyl chloromethyl ether (6.02 parts), petroleum of boiling range 40–60° previously dried over sodium (16 parts) and silver hyponitrite (6.62 parts) are stirred together during 5½ hours in a reaction flask cooled in ice. The reaction mixture is filtered and the residue washed five times with 3 parts cold petroleum. The combined filtrate and washings are stored at —40° C. The filtrate contains no reactive chlorine and 1 ml. of this solution warmed to 40° C. evolves 8.4 ccs. of a gas consisting mainly of nitrogen together with 5% of nitrous oxide. Evaporation of the solvent at —15° C. leaves a yellowish liquid which sets to a glass when cooled to —75° C., has a refractive index ($n_D^{20}$) of 1.4300 and decomposes at 28–30° C. 0.1327 gram of this liquid evolves on being warmed 8.1 ccs. of gas consisting mainly of nitrogen, corresponding to a content of 79% of 1:3-dimethylbutoxymethyl hyponitrite.

*Example 31*

9.9 parts silver hyponitrite are mixed with 15 parts white spirit previously dried over sodium. To the suspension constantly stirred and maintained at 0° C. are added during 20 minutes 11.5 parts 3:5:5-trimethylhexyl chloromethyl ether. Stirring is continued during 16½ hours at 0° C. The mixture is filtered through a sintered glass filter cooled to 0° C. and the residue is washed with 4 parts white spirit. The combined filtrate and washings are stored at —40° C. 0.5 ml. of this solution warmed to 40° C. evolves 7.4 ccs. of a gas consisting principally of nitrogen together with 1.2% hydrogen and 3.5% nitrous oxide. The calculated yield of hyponitrous ester is 6.6 parts or 59% of theoretical.

*Example 32*

5 parts of (β-ethoxy)ethoxymethylchloride (B.P. 161–164° C.; 92.5% pure) are stirred with 5.8 parts of silver hyponitrite in 30 parts of diethyl oxalate at 0° C. for 5 hours. The suspension is filtered and the residue is washed twice with 5 parts of diethyl oxalate. By the method of Example 7 the combined filtrates are shown to be a 9.1% solution of (β-ethoxy) ethoxymethyl hyponitrite. The decomposition gases are substantially nitrogen containing 2% nitrous oxide and 5% hydrogen.

*Example 33*

587 parts of ethyl orthoacetate, 580 parts of silver hyponitrite, 2000 parts of diethyl ether are stirred together at —20° C. and 890 parts of a 4.1 N solution of HCl in ether are added. After 6¾ hours the mixture is filtered and the residue is washed twice with 500 parts of ether. The whole is kept at —50° C. for 72 hours. The solvent is then evaporated at —20° C. and leaves 400 parts of a liquid in which a small amount of solid (probably hyponitrous acid) is suspended. The liquid contains 9.0% N (theory for α:α:α':α'-tetraethoxyethyl hyponitrite 9.5% N), and has an infra red absorption at 986 and 995 cm.$^{-1}$ which is typical of organic hyponitrites whereas hyponitrous acid dissolved in dimethyl formamide absorbs at 1002 and 1024 cm.$^{-1}$. The liquid is moderately explosive and is a powerful catalyst for the polymerisation of ethylene.

When, for comparison, ethyl orthoacetate in diethyl ether is treated with an ethereal solution of hyponitrous acid a catalytically active substance is not produced.

*Example 34*

To a pressure vessel are charged 265 parts of silver hyponitrite and 40,000 parts of liquid ethylene at —62° C. and a pressure of 160 atm. gauge. 53 parts of chloromethyl ether are then introduced and the vessel is stirred at a temperature below —50° C. for 4 hours. The stirrer is stopped and the solid is allowed to settle over ¼ hour. The fluid contents of the vessel are then discharged by means of an internal stand-pipe to an evacuated storage vessel. After discharge, the pressure in each vessel is 50 atm. and the temperature of the storage vessel is −5° C. A second flush of liquid ethylene is passed through the reaction vessel to the storage vessel.

When the reaction vessel is opened it is found to contain a residue of silver chloride and excess silver hyponitrite. When the contents of the storage vessel are admixed with 10 times more ethylene, compressed to 1500 atm. and allowed to warm to room temperature, polymerisation of the ethylene ensues.

*Example 35*

2.45 parts of isobutyl chloromethyl ether are added to 1.66 parts of sodium hyponitrite (estimated purity, 78%) suspended in 15 parts of white spirit, previously dried over sodium. The mixture is stirred during 6½ hours at 0° C. The solid is separated by filtration and washed with 7 parts white spirit. The combined filtrate and washings are stored at a temperature of −30° C. 1 millilitre of this solution evolves on being warmed 0.77 cubic centimetre of gas consisting principally of nitrogen. The infra red spectrum of the solution contains absorption bands previously observed in the spectrum of an authentic sample of isobutoxymethyl hyponitrite in white spirit.

*Example 36*

Similarly to Example 35, when the reaction is carried out in acetone, the resultant solution gives off 3.9 cubic centimetres of gas per millilitre on being warmed and, after isolation and redissolution in petroleum, its infra red spectrum contains absorption bands ascribed to isobutoxymethyl hyponitrite. The isolated material is a viscous oil which crystallises on storage at −80° C., the crystals do not remelt until a temperature of 0° C. is approached.

*Example 37*

Similarly to Example 35, when 2.37 parts of 84% barium hyponitrite in 15 parts of white spirit are used, the resultant solution gives off 3.0 cubic centimetres of gas per millilitre on being warmed and its infra red spectrum contains bands due to isobutoxymethyl hyponitrite. The barium salts filtered off at the end of the reaction and washed free of organic chloride contain a water-soluble chloride.

*Example 38*

Similarly, when 3.2 parts of 91% lead hyponitrite are used, the resultant solution contains isobutoxymethyl hyponitrite and gives off 2.8 cubic centimetres of gas per millilitre on being warmed.

*Example 39*

Similarly, when 1.49 parts of copper hyponitrite are used, the resultant solution contains isobutoxymethyl hyponitrite and gives off 2.95 cubic centimetres of gas per millilitre on being warmed.

*Example 40*

Similarly, when 2.8 parts of thallium hyponitrite are used, the resultant solution contains isobutoxymethyl hyponitrite, which is recognised by the characteristic infra red spectrum.

*Example 41*

Similarly, when 1.43 parts of cobalt hyponitrite are used, the resultant solution contains isobutoxymethyl hyponitrite and gives off 0.94 cubic centimetre of gas per millilitre on being heated.

*Example 42*

Similarly, when 1.38 parts of manganese hyponitrite are used, the resultant solution contains isobutoxymethyl hyponitrite and gives off 1.05 cubic centimetres of gas per millilitre on being heated.

What we claim is:

1. Esters of hyponitrous acid selected from the group consisting of esters having the general formula:

$$X-O-CY'Y-O-N=N-O-CY'Y-O-X$$

wherein X is selected from the group consisting of alkyl, alkoxyalkyl, cycloalkyl, aryl, and a divalent hydrocarbon radical forming part of a ring that also includes O and Y, Y is selected from the group consisting of hydrogen, alkyl, alkoxyalkyl, cycloalkyl, aryl, alkoxy, and a divalent hydrocarbon radical forming part of a ring that also includes O and X, and Y' is selected from the group consisting of hydrogen and lower alkyl and polymeric esters having a general structure derived by linkage of at least two molecules having said general formula $$X-O-CY'Y-O-N=N-O-CY'Y-O-X$$

by a further hyponitrite radical, which replaces in each of said molecules one hydrogen selected from those of the X and Y radicals.

2. Esters of hyponitrous acid having the formula $$(XOCHYON)_2$$

wherein X is a lower alkyl and Y is hydrogen.

3. Esters of hyponitrous acid having the formula $$(XOCHYON)_2$$

wherein X and Y are lower alkyl.

4. Bis-tetrahydrofuran-2-hyponitrite.
5. Bis-isobutoxymethyl hyponitrite.
6. Bis-tetrahydropyran-2-hyponitrite.
7. Bis-cyclohexyloxymethyl hyponitrite.
8. Bis-methoxymethyl hyponitrite.

References Cited in the file of this patent
Partington et al.: "J.C.S.," 2593–97 (1932).